United States Patent
Anson

(10) Patent No.: US 7,560,881 B2
(45) Date of Patent: Jul. 14, 2009

(54) ELECTRIC DRIVE FUEL CONTROL SYSTEM AND METHOD

(75) Inventor: Bruce Anson, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 11/764,478

(22) Filed: Jun. 18, 2007

(65) Prior Publication Data

US 2008/0309261 A1   Dec. 18, 2008

(51) Int. Cl.
*H02P 1/54* (2006.01)

(52) U.S. Cl. .............................. 318/53; 318/34; 318/41; 318/49; 123/495; 123/497

(58) Field of Classification Search .................... 318/53, 318/34, 41, 49, 51, 68, 122, 137; 123/495, 123/497
See application file for complete search history.

(56) References Cited

U.S. PATENT DOCUMENTS 4,761,588 A * 8/1988 Youcef-Toumi et al. ........ 318/46
5,365,153 A * 11/1994 Fujita et al. .................... 318/34
5,374,877 A * 12/1994 Imaseki et al. ................ 318/34
6,971,373 B2 * 12/2005 Mudway et al. ............. 123/497
7,230,393 B2 * 6/2007 Hommi et al. ................ 318/52

* cited by examiner

*Primary Examiner*—Bentsu Ro
*Assistant Examiner*—Thai Dinh
(74) *Attorney, Agent, or Firm*—Ingrassia Fisher & Lorenz, P.C.

(57) ABSTRACT

An electric drive fuel control system and method for controlling a total drive torque supplied to a fuel metering pump includes a first main drive motor, a second main drive motor, and a backup drive motor, all coupled to the fuel metering pump. The operability of a main motor control to control electric current supply to the first main drive motor or the second main drive motor is determined. If the main motor control is operable, the total drive torque to the fuel pump is supplied from the backup motor and either the first main drive motor or the second main drive motor. If the main motor control is inoperable, the total drive torque to the fuel pump is supplied from only the backup drive motor.

20 Claims, 1 Drawing Sheet

ELECTRIC DRIVE FUEL CONTROL SYSTEM AND METHOD

TECHNICAL FIELD

The present invention relates to gas turbine engine fuel control and, more particularly, to a system and method for controlling the total drive torque supplied to an electric-motor-driven fuel pump.

BACKGROUND

Many gas turbine engine fuel supply systems include a fuel source, such as a fuel tank, and one or more pumps that draw fuel from the tank and deliver pressurized fuel to the fuel manifolds in the engine combustor via a main supply line. The main supply line may include one or more valves in flow series between the pumps and the fuel manifolds. These valves generally include, for example, a main metering valve and a pressurizing-and-shutoff valve downstream of the main metering valve. In addition to the main supply line, many fuel supply systems also include a bypass flow line connected upstream of the metering valve that bypasses a portion of the fuel flowing in the main supply line back to the inlet of the one or more pumps, via a bypass valve. The position of the bypass valve is typically controlled by a head regulation scheme to maintain a substantially fixed differential pressure across the main metering valve.

The above-described fuel supply system is generally safe, reliable, and robust. Nonetheless, it can suffer certain drawbacks. For example, the metering valve and bypass valve can add to overall system weight and complexity. Moreover, control of the metering valve and bypass valve can result in increased system complexity and cost. Thus, in recent years there has been a desire to implement fully electric fuel controls by, for example, controlling the speed of a fuel metering pump. Yet, such efforts have been impeded because of the desire to maintain at least certain functions and features of present, non-fully electric fuel supply and control systems.

For example, most non-fully electric fuel supply and control systems are designed for certain postulated events that may result in certain postulated off-nominal operational modes, which in turn may result in certain postulated effects. One such postulated event is a loss of power. To accommodate this postulated event, the fuel supply and control system is typically designed such that, in the highly unlikely occurrence of a loss of power, the fuel metering valve "fails fixed." That is, the fuel metering valve will remain in the position it was in when the postulated loss of power event occurs. As a result, fuel flow to the engine will remain at the flow rate that was commanded when the postulated loss of power event occurred.

Hence, there is a need for an electric fuel supply and control system that will implement a "fail fixed" feature in the unlikely event of a loss of power or other postulated event(s) that could prevent or inhibit fuel flow. Moreover, although a "fail fixed" configuration is generally safe and reliable, it is additionally desirable that the pilot be provided with a means to manually manipulate fuel flow to the engine during one of these postulated events. The present invention addresses at least these needs.

BRIEF SUMMARY

In one embodiment, and by way of example only, an electric fuel control system for supplying a total drive torque to a fuel metering pump includes a first main drive motor, a second main drive motor, a backup drive motor, a main motor control, and a backup motor control. The first main drive motor is operable, upon being supplied with current, to generate a torque proportional to the current supplied thereto. The second main drive motor is coupled to the first main drive motor and is operable, upon being supplied with current, to generate a torque proportional to the current supplied thereto. The backup drive motor is coupled to the first and second main drive motors and is operable, upon being supplied with current, to generate a torque proportional to the current supplied thereto. The main motor control is coupled to the first and second main drive motors. The main motor control is operable to selectively designate either the first main drive motor or the second main drive motor as an active main drive motor, and is further adapted to receive a first command signal representative of the total drive torque and is further operable, upon receipt of the command signal, to control the current supplied to the active main drive motor such that the torque generated by the active main drive motor is a fraction of the total drive torque. The backup motor control is coupled to the backup drive motor and is adapted to receive a second command signal. The backup motor control is operable to determine operability of the main motor control and is responsive to the second command signal to control the current supplied to the backup drive motor such that if the main motor control is operable, the backup drive motor and the active main drive motor together generate the total drive torque, and if the main motor control is inoperable, the backup drive motor generates the total torque.

In another exemplary embodiment, a method of controlling a total drive torque supplied to a fuel metering pump in a system that includes a first main drive motor, a second main drive motor, and a backup drive motor, all coupled to the fuel metering pump, includes the step of determining operability of a main motor control to control electric current supply to the first main drive motor or the second main drive motor. If the main motor control is operable, the total drive torque to the fuel pump is supplied from the backup motor and either the first main drive motor or the second main drive motor. If the main motor control is inoperable, the total drive torque to the fuel pump is supplied from only the backup drive motor.

Other independent features and advantages of the preferred system and method will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

Figure 1:
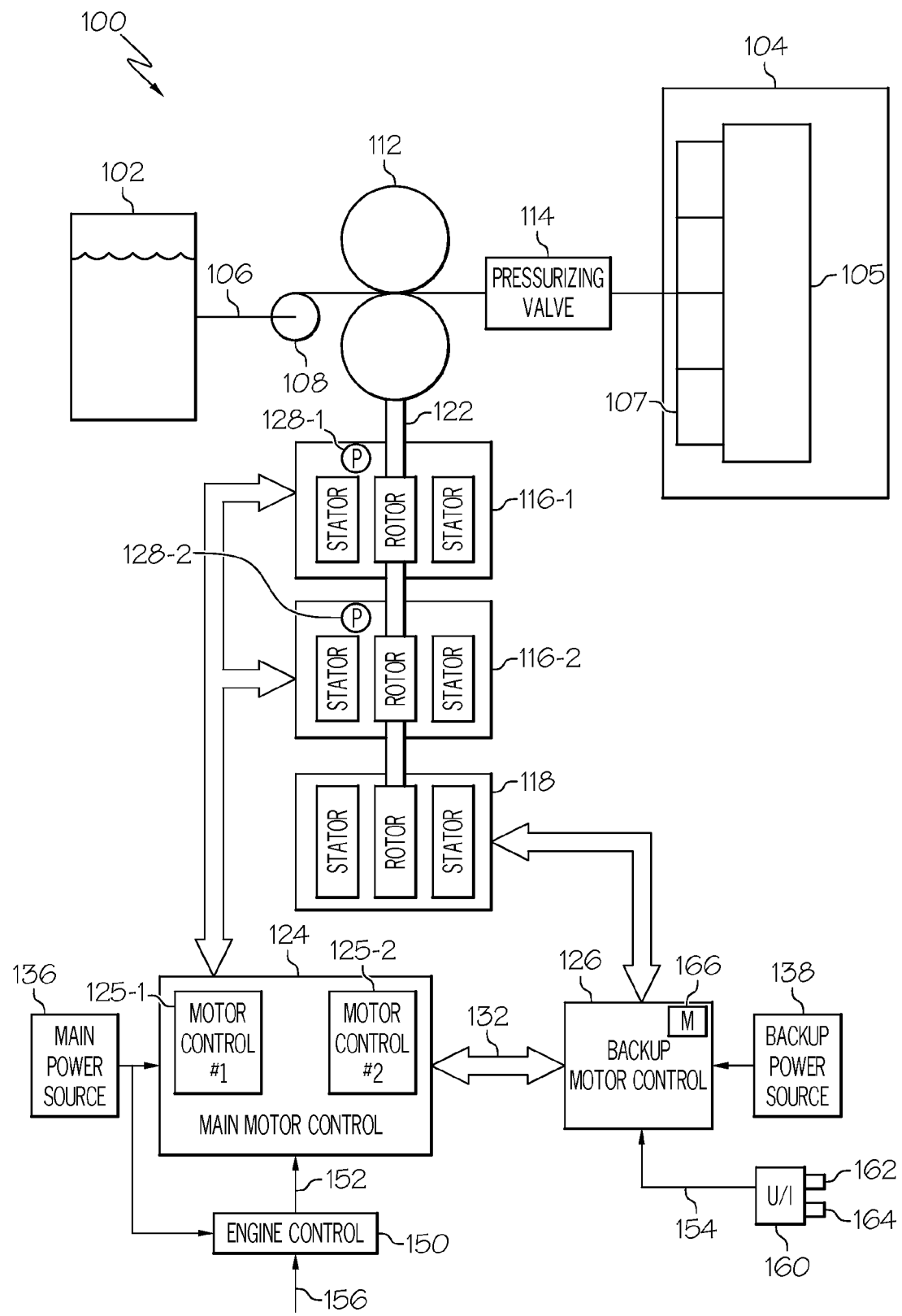
FIG. 1 is a block diagram of fuel delivery and control system for a gas turbine engine according to an exemplary embodiment of the present invention.

The following detailed description is merely exemplary in nature and is not intended to limit the invention or the application and uses of the invention. Furthermore, there is no intention to be bound by any theory presented in the preceding background or the following detailed description.

A fuel delivery and control system for a gas turbine engine according to one exemplary embodiment is depicted in FIG. 1. The system 100 includes a fuel source 102, such as a tank, that stores the fuel supplied to a gas turbine engine 104, and more specifically a combustor 105 in the gas turbine engine 104. A supply line 106 is coupled to the fuel source 102 and, via various components, delivers the fuel to the combustor 105 via a plurality of fuel nozzles 107. It is noted that the supply line 106 is, for convenience, depicted and described with a single reference numeral. However, it will be appreciated that the system 100 may be implemented using separate sections of piping, though a single section is certainly not prohibited.

One or more electrically powered pumps are positioned in flow-series in the supply line 106 and draw fuel from the fuel source 102. In the depicted embodiment, a booster pump 108, such as a relatively low horsepower centrifugal pump, and a high pressure fuel metering pump 112, such as a positive displacement pump, are used. The booster pump 108 draws fuel directly from the fuel source 102 and provides sufficient suction head for the fuel metering pump 112. The booster pump 108 may be either mechanically driven by the engine, or electrically driven by a non-illustrated motor. Moreover, the booster pump 108 may, in some embodiments, not be included.

In the depicted embodiment, a pressurizing valve 114, which is sometimes referred to as a pressurizing-and-shutoff valve, is positioned in flow-series in the supply line 106 downstream of the fuel metering pump 112 and functions to ensure a minimum system pressure magnitude is in the supply line 106 downstream of the fuel metering pump 112. The pressurizing valve 114 is disposed between the fuel metering pump 112 and the combustor 105, and is movable between a closed position and an open position. In the closed position, fuel flow through the pressurizing valve 114 and to the combustor 105 is prohibited. Conversely, in the open position, fuel flow through the pressurizing valve 114 may occur. The pressurizing valve 114 is preferably configured to move from its closed position to an open position when the fuel metering pump discharge pressure reaches a predetermined pressure, and is further configured to move to the closed position when the fuel metering pump discharge pressure falls below the predetermined pressure. It will be appreciated that in some embodiments, the system may be configured such that the pressurizing valve 114 is disposed in a non-illustrated return line to the inlet of the fuel metering pump 112. It will additionally be appreciated that the pressurizing valve 114 may not be included in other embodiments.

The fuel metering pump 112 is preferably an electrically powered positive displacement pump that is driven, depending on the system configuration, by one or more drive motors. More specifically, the system 100 includes a plurality of main drive motors 116 (e.g., a first main drive motor 116-1 and a second main drive motor 116-2), and a backup drive motor 118, all of which are coupled together and to the fuel metering pump 112. Preferably, the main drive motors 116 and the backup drive motor 118 are all mounted on a common shaft 122, which is coupled to the fuel metering pump 112. It will be appreciated, however, that this is merely exemplary, and that each drive motor 116, 118 could be mounted on individual shafts that are coupled together. It will additionally be appreciated that the number of main drive motors 116 could be more than two, if needed or desired. Moreover, the drive motors 116, 118 are preferably brushless motors, though it will be appreciated that the drive motors 116, 118 could be implemented using any one of numerous types of AC or DC motors.

No matter the particular type (or types) of motors that are used, the drive motors 116, 118 are each configured, upon being supplied with electrical current, to generate and supply drive torque to the fuel metering pump 112. As will be described in more detail further below, during system operation, either one of the main drive motors 116 and the backup drive motor 118, or just the backup drive motor 118, will be operating and generating torque. The total torque that is generated by one of the main drive motors 116 and the backup drive motor 118, or by just the backup drive motor 118, is supplied to the fuel metering pump 112. The fuel metering pump 112, as was noted above, is preferably a positive displacement pump, such as a gear pump, and is configured, upon receiving the total drive torque supplied from one or more of the drive motors 116, 118, to supply fuel, at a relatively high pump discharge pressure, such as up to 1200 psig, to the remainder of the supply line 106.

The system 100 additionally includes a plurality of motor controls that are configured to control the supply of electrical current to each of the drive motors 116, 118, to thereby control the total torque supplied to the fuel metering pump 112. In particular, a main motor control 124 is coupled to, and controls the supply of electrical current to, and thus the torque generated by, the main drive motors 116. In addition, a backup motor control 126 is coupled to, and controls the supply of electrical current to, and thus the torque generated by, the backup drive motor 118. The main motor control 124 is operable to selectively designate either the first main drive motor 116-1 or the second main drive motor 116-2 as the active main drive motor. The main motor control 124 is also adapted to receive an automatically generated command signal 152 representative of the total drive torque needed to drive the fuel metering pump 112 at a speed to deliver a desired fuel flow rate to the combustor 105. The main motor control 124 is operable, upon receipt of the command signal 154, to control the current supplied to the active main drive motor drive motor 116 such that the torque generated by the active main drive motor 116 is a fraction of the total drive torque.

More specifically, and as FIG. 1 further depicts, the main motor control 124 includes two independent motor controls, a first main motor control 125-1 and a second main motor control 125-2. The first and second main motor controls 125-1, 125-2 are each coupled to both of the main drive motors 116, and are each operable to selectively control the current supplied to either of the main drive motors 116. During system operation, either the first main motor control 125-1 or the second main motor control 125-2 is active, while the other is in standby. Moreover, the active main motor control designates one of the main drive motors 116 as the active motor and the other main drive motor 116 as the standby motor, and selectively controls the current supplied to the active main drive motor 116 to generate the fraction of the total drive torque.

It is additionally noted that the first and second main motor controls 125-1, 125-2, like the main drive motors 116, may be variously configured to implement various motor control schemes. Preferably, however, when the main drive motors 116 are implemented as brushless machines, the first and second main motor controls 125-1, 125-2 are each configured to implement position feedback motor commutation control. As such, and as FIG. 1 further depicts, the system 100 may additionally include a first main drive motor rotational position sensor 128-1 and a second main drive motor rotational position sensor 128-2. The first main drive motor rotational position sensor 128-1 is operable to sense the rotational position of the first main drive motor rotor and to supply a signal representative thereof to the main motor control 124. The second main drive motor rotational position sensor 128-2 is operable to sense the rotational position of the second main drive motor rotor and to supply a signal representative thereof to the main motor control 124. Though not depicted, the system 100 may additionally include one or more current sensors to supply signals representative of the current supplied to the active main drive motor 116 to the main motor control 124.

The backup motor control 126 is in operable communication with the main motor control 124 via a suitable communication link 132. The main motor control 124 is operable, in response to data received via the communication link 132, to determine operability of the backup motor control 126. Moreover, the backup motor control 126 is operable, in response to data received via the communication link 132, to determine the operability of the main motor control 124. It is noted that operability of the backup motor control 126, at least as used herein, means that the backup motor control 126 and the backup drive motor 118 are operable to supply the desired fraction of the total drive torque to the fuel metering pump 112. Thus, the main motor control 124 determines that the backup motor control 126 is inoperable if the backup motor control 126 and/or the backup drive motor 118 is inoperable. Similarly, operability of the main motor control 124, at least as used herein, means that at least one of the first or second main motor controls 125-1, 125-2 and at least one of the main drive motors 116-1, 116-2 are operable to supply the desired fraction of the total drive torque to the fuel metering pump 112. Thus, the backup motor control 126 determines that the main motor control 124 is inoperable if neither of the first or second main motor controls 125-1, 125-2 is operable and/or if neither of the main drive motors 116-1, 116-2 is operable.

The backup motor control 126 is selectively responsive to either an automatically generated command signal or to a manual command signal 154 to control the current supplied to the backup drive motor 118, in dependence upon the determined status of the main motor control 124. Specifically, if the main motor control 124 is determined to be operable, the backup motor control 126 will be responsive to the automatically generated command signal to control the current supplied to the backup drive motor 118 such that the backup drive motor 118 generates the remaining fraction of the total drive torque. If, however, the main motor control 124 is determined to be inoperable, the backup motor control 126 will be initially responsive to the automatically generated command signal to control the current supplied to the backup drive motor 118 such that the backup drive motor 118 will generate the entirety of the total drive torque. Thereafter, the backup motor control 126 will be responsive to manual command signals 154 supplied from a user interface 160, which is briefly described in more detail further below. It will be appreciated that the backup motor control 126 is preferably configured to be responsive to manual command signals 154 only when the main motor control 124 is determined to be inoperable.

It is noted that the automatically generated command signal supplied to the backup motor control 126 may be the same automatically generated command signal 152 that is supplied to the main motor control 124 or, as depicted in FIG. 1, it may be a separate command signal supplied via the communication link 132. It is additionally noted that the backup motor control 126, similar to the main motor control 124, may be variously configured to implement various motor control schemes. Preferably, however, when the backup drive motor 118 is implemented as a brushless machine, the backup motor control 126, unlike the main motor control 124, is configured to implement sensorless motor commutation control.

Before proceeding further it is noted that the main motor control 124 and the backup motor control 126 may be variously configured to control the current supplied to the active main drive motor 116 and the backup drive motor 118, respectively, to control the total drive torque fractions supplied by the drive motors 116, 118 to the fuel metering pump 112. For example, the main motor control 124 and the backup motor control 126 could be configured such that, when the main motor control 124 is operable, the active main drive motor 116 will supply 70% of the total drive torque to the fuel metering pump 112 and the backup drive motor 118 will supply the remaining 30% of the total drive torque to the fuel metering pump 112. No matter the specific total drive torque fractions supplied by each drive motor 116, 118, the main motor control 124 and the backup motor control 126 are preferably configured such that the active main drive motor 116 will supply a majority of the total drive torque. It will be appreciated, however, that this is merely exemplary, and that the main motor control 124 and backup motor control 126 could be configured such that the backup drive motor 118 supplies a majority of the total drive torque when the main motor control 124 is operable.

Returning once again to the description, it is seen that the depicted system 100 further includes an engine control 150. The engine control 150, which may be implemented as a Full Authority Digital Engine Controller (FADEC) or other electronic engine controller (EEC), controls the flow rate of fuel to the combustor 105. To do so, the engine control 150 receives various input signals and controls the fuel flow rate to the combustor 105 accordingly. In particular, the engine control 150 receives a fuel flow command signal 156 from, for example, throttle control equipment (not illustrated) in a cockpit. The engine control 150, in response to at least this signal, determines an appropriate motor speed command, and automatically generates the above-mentioned command signal 152 that is supplied to the main motor control 124. In response to the command signal 152, the main motor control 124 supplies, via the communication link 132, the appropriate command signal to the backup motor control 126. As was alluded to above, in some embodiments the engine control 150 and backup motor control 126 may be configured such that the automatically generated command signal 152 is supplied directly to the backup motor control 126. It will additionally be appreciated that in some embodiments, the main motor control 124 may be incorporated into the engine control 150.

As FIG. 1 additionally depicts, the system 100 may be configured to draw electrical power from two independent power sources. For example, it is seen that in the depicted embodiment the main motor control 124 is coupled to, and is electrically powered from, a main power source 136, and the backup motor control 126 is coupled to, and is electrically powered from, a backup power source 138. The main power source 136 is preferably a main power bus in the aircraft or other vehicle in which the system 100 is installed, and the backup power source 138 is preferably a reliable, backup electrical source, such as a battery. It will be appreciated that the main power source 136 is also the power source used to selectively energize the active main drive motor 116, and that the backup power source 138 is also the power source used to selectively energize the backup drive motor 118.

As was previously noted, the system 100 further includes a user interface 160 that is operable to selectively supply manual command signals 154. The user interface 160 may be variously configured to supply these signals, but in the depicted embodiment the user interface 160 includes a flow increase user interface 162 and a flow decrease user interface 164. The flow increase user interface 162 and flow decrease user interface 164 are each adapted to receive input stimuli from a user, such as a pilot. The user interface 160 is configured to supply the manual command signals when input stimuli is supplied to the either the flow increase user interface 162 or the flow decrease user interface 164.

Having described the overall physical implementation of the system 100 and the various constituent components, a description of the overall operation of the system 100 will now be described. In doing so, it is initially assumed that both main motor controls 125-1, 125-2 and both main drive motors 116-1, 116-2 are operable, that the backup motor control 126 has made this determination, and that the main motor control 124 is configured such that the first main motor control 125-1 and the first main drive motor 116-1 are active.

With the above-described configuration, when the engine control 150 supplies the command signal 152 to the main motor control 124, the first main motor control 125-1 will control the current supplied to the first main drive motor 116-1 such that it generates a fraction of the total drive torque needed for the fuel metering pump 112 to deliver the desired fuel flow. The main motor control 124 will also transmit, via the communication link 132, the appropriate command signal to the backup motor control 126. The backup motor control 126, in response to the command signal received via the communication link 132, will control the current supplied to the backup drive motor 118 such that it generates the remaining fraction of the total drive torque needed for the fuel metering pump 112 to deliver the desired fuel flow.

The system 100 will continue to operate as described above unless one or more postulated events occur. For example, if the main motor control 124 determines that the backup motor control 124 has become inoperable, then the main motor control 126 will reconfigure itself to control the current supplied to the active main drive motor 116 such that it generates the entirety of the total drive torque needed for the fuel metering pump 112 to deliver the desired fuel flow. Moreover, if the main motor control 124 determines that the first main drive motor 116-1 has somehow become partially or completely inoperable, then the main motor control 124 will automatically reconfigure itself so that the first main drive motor control 125-1 will control the current supplied to the second main drive motor 116-2 such that it generates the fraction of the total drive torque needed for the fuel metering pump 112 to deliver the desired fuel flow. Similarly, if the main motor control 124 determines that the first main motor control 125-1 has somehow become partially or completely inoperable, then the main motor control 124 will automatically reconfigure itself so that the second main drive motor control 125-2 will control the current supplied to the first main drive motor 116-1 such that it generates the fraction of the total drive torque needed for the fuel metering pump 112 to deliver the desired fuel flow.

If, on the other hand, the backup motor control 126 determines that the main motor control 124 is inoperable, then the backup motor control 126 will store in, for example, a memory 166, the automatically generated command that it was being supplied with when this determination was made. The backup motor control 126 will then reconfigure itself to control the current supplied to the backup drive motor 118 such that it generates the entirety of the total drive torque needed for the fuel metering pump 112 to deliver the desired fuel flow. The system 100 thus implements what is generally referred to as a "fail-fixed" feature. That is, upon the main motor control 124 becoming inoperable, the fuel flow supplied by the fuel metering pump 112 will be fixed at the last commanded flow rate.

In addition to the above, if the pilot desires to increase or decrease fuel flow rate while the main motor control 124 is inoperable, the pilot may do so via the user interface 160.

More specifically, if the pilot wishes to increase fuel flow rate, then the pilot supplies input stimuli to the flow increase user interface 162. In response, the user interface 160 will supply manual increase command signals 154 to the backup motor control 126. The backup motor control 126 will, in response, control the current supplied to the backup drive motor 118 such that it will generate an increased amount of torque. Similarly, if the pilot wishes to decrease fuel flow rate, then the pilot supplies input stimuli to the flow decrease user interface 164. In response, the user interface 160 will supply manual decrease command signals 154 to the backup motor control 126. The backup motor control 126 will, in response, control the current supplied to the backup drive motor 118 such that it will generate a decreased amount of torque.

It is further noted that the system 100 will operate similar to that described above in the unlikely event the main power source 136 becomes inoperable. If such an unlikely event were to occur, the backup motor control 126 would determine that the main motor control 124 is inoperable, and would reconfigure itself as described above.

The system 100 described herein and depicted in FIG. 1 provides for an all electric fuel metering control solution, yet duplicates various features of present electro-hydraulic fuel metering controls, such as a "fail-fixed" feature.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An electric fuel control system for supplying a total drive torque to a fuel metering pump, the system comprising:

a first main drive motor operable, upon being supplied with current, to generate a torque proportional to the current supplied thereto;

a second main drive motor coupled to the first main drive motor and operable, upon being supplied with current, to generate a torque proportional to the current supplied thereto;

a backup drive motor coupled to the first and second main drive motors and operable, upon being supplied with current, to generate a torque proportional to the current supplied thereto;

a main motor control coupled to the first and second main drive motors, the main motor control operable to selectively designate either the first main drive motor or the second main drive motor as an active main drive motor, the main motor control further adapted to receive a first command signal representative of the total drive torque and further operable, upon receipt of the command signal, to control the current supplied to the active main drive motor such that the torque generated by the active main drive motor is a fraction of the total drive torque;

a backup motor control coupled to the backup drive motor and adapted to receive a second command signal, the backup motor control operable to determine operability of the main motor control and responsive to the second command signal to control the current supplied to the backup drive motor such that:
(i) if the main motor control is operable, the backup drive motor and the active main drive motor together generate the total drive torque, and
(ii) if the main motor control is inoperable, the backup drive motor generates the total torque.

2. The system of claim 1, wherein:
if the main motor control is operable, the main motor control and the backup motor control respectively control the current supplied to the active main drive motor and to the backup drive motor such that the active main drive motor generates a majority of the total drive torque.

3. The system of claim 1, wherein:
the main motor control includes a first main motor control and a second main motor control;
the first main motor control is coupled to the first main drive motor and the second main drive motor, and is operable to selectively control the current supplied to either the first main drive motor or the main drive second motor; and
the second main motor control is coupled to the first main drive motor and the second main drive motor, and is operable to selectively control the current to either the first main drive motor or the main drive second motor.

4. The system of claim 1, further comprising a fuel pump coupled to receive the total drive torque.

5. The system of claim 1, wherein the backup motor control is further operable, upon determining that the main motor control is inoperable, to generate the total torque based on the second command signal that was received when the main motor control was determined to be inoperable.

6. The system of claim 5, wherein the backup motor control is further adapted to receive a manual input signal and is selectively responsive to the manual input signal to control the current supplied to the backup drive motor to thereby vary the torque generated by the backup drive motor.

7. The system of claim 6, wherein the backup motor control is configured to be responsive to the manual input signal only when the main power source is inoperable.

8. The system of claim 7, wherein the manual input signal is either an increase command signal or a decrease command signal.

9. The system of claim 8, further comprising:
a user interface adapted to receive input stimuli from a user and operable, in response to the input stimuli, to selectively supply either the increase command signal or the decrease command signal.

10. The system of claim 1, wherein:
the backup drive motor is a brushless machine; and
the backup motor control implements sensorless motor commutation control.

11. The system of claim 1, wherein;
the first and second main drive motors are each brushless machines that include a rotationally mounted rotor and a stator, and
the main motor control implements position feedback motor commutation control.

12. The system of claim 11, further comprising:
a first main drive motor rotational position sensor operable to sense rotational position of the first main drive motor rotor and supply a signal representative thereof to the main motor control; and
a second main drive motor rotational position sensor operable to sense rotational position of the second main drive motor rotor and supply a signal representative thereof to the main motor control.

13. The system of claim 1, further comprising:
an engine control adapted to be energized from the main power source and operable to selectively supply the command signal.

14. The system of claim 13, wherein the backup motor control is further operable, upon determining that the main motor control is inoperable, to store the command signal supplied from the engine control at least when the main power source was determined to be inoperable.

15. A method of controlling a total drive torque supplied to a fuel metering pump in a system that includes a first main drive motor, a second main drive motor, and a backup drive motor, all coupled to the fuel metering pump, the method comprising the steps of:
determining operability of main motor control to control electric current supply to the first main drive motor or the second main drive motor;
if the main motor control is operable, supplying the total drive torque to the fuel pump from (i) the backup motor and (ii) either the first main drive motor or the second main drive motor; and
if the main motor control is inoperable, supplying the total drive torque to the fuel pump from only the backup drive motor.

16. The method of claim 15, wherein, if the main motor control is operable, either the first main drive motor or the second main drive motor supplies a majority of the total drive torque.

17. The method of claim 15, further comprising:
If the main motor control is inoperable, varying the total drive toque supplied from the backup drive motor to the fuel pump via manual command signals supplied from a user interface.

18. The method of claim 15, further comprising:
if the main motor control is operable, controlling the total drive torque supplied to the fuel pump based on automatic commands supplied from an engine control; and
if the main motor control is inoperable, controlling the total drive torque supplied from the backup drive motor to the fuel pump via manual command signals supplied from a user interface.

19. The method of claim 18, wherein, if the main motor control is inoperable, the method further comprises:
storing the automatic command supplied from the engine control when the main electrical power source is determined to be inoperable; and
at least initially controlling the total drive torque supplied to the fuel pump from the backup drive motor based on the stored automatic command.

20. The method of claim 19, wherein, if the main motor control is inoperable, the method further comprises:
selectively supplying manual command signals from a user interface;
if no manual command signals have been supplied from the user interface, controlling the total drive torque supplied to the fuel pump from the backup drive motor based on the stored automatic command; and
if no manual command signals have been supplied from the user interface, controlling the total drive torque supplied to the fuel pump from the backup drive motor based on the manual command.

* * * * *